United States Patent
Chambers

(10) Patent No.: US 8,723,458 B1
(45) Date of Patent: May 13, 2014

(54) SOFT START DRIVE FOR MOBILE REFRIGERATION UNIT

(76) Inventor: Billy Chambers, Dallas, TX (US)

( * ) Notice: Subject to any disclaimer, the term of this patent is extended or adjusted under 35 U.S.C. 154(b) by 126 days.

(21) Appl. No.: 13/300,441

(22) Filed: Nov. 18, 2011

Related U.S. Application Data

(60) Provisional application No. 61/458,185, filed on Nov. 19, 2010.

(51) Int. Cl.
*H02P 7/00* (2006.01)
*F25B 27/00* (2006.01)

(52) U.S. Cl.
USPC .......................................... 318/140; 62/323.3

(58) Field of Classification Search
USPC .................................. 318/140; 62/228, 323.3
See application file for complete search history.

(56) References Cited

U.S. PATENT DOCUMENTS

| | | | |
|---|---|---|---|
| 5,575,085 A * | 11/1996 | Groombridge | 34/368 |
| 6,622,505 B2 | 9/2003 | Anderson et al. | |
| 7,635,959 B2 | 12/2009 | Holden et al. | |
| 7,957,166 B2 | 6/2011 | Schnetzka et al. | |
| 8,004,803 B2 | 8/2011 | Schnetzka | |
| 2003/0000236 A1* | 1/2003 | Anderson et al. | 62/228.3 |
| 2007/0290646 A1* | 12/2007 | Hasenour et al. | 318/487 |
| 2009/0008936 A1* | 1/2009 | Dooley | 290/7 |
| 2010/0143158 A1* | 6/2010 | Alston | 417/44.11 |

* cited by examiner

*Primary Examiner* — Eduardo Colon Santana
*Assistant Examiner* — Gabriel Agared
(74) *Attorney, Agent, or Firm* — Buskop Law Group, PC; Wendy Buskop

(57) ABSTRACT

A system for driving a three phase motor using a variable speed drive in communication with an alternator driven by a prime mover. A rectifier can be connected with the alternator. The system can also include a logic and alternator field drive configured to sense voltage leaving the rectifier and controlling the alternator to maintain a predetermined output from the rectifier.

4 Claims, 1 Drawing Sheet

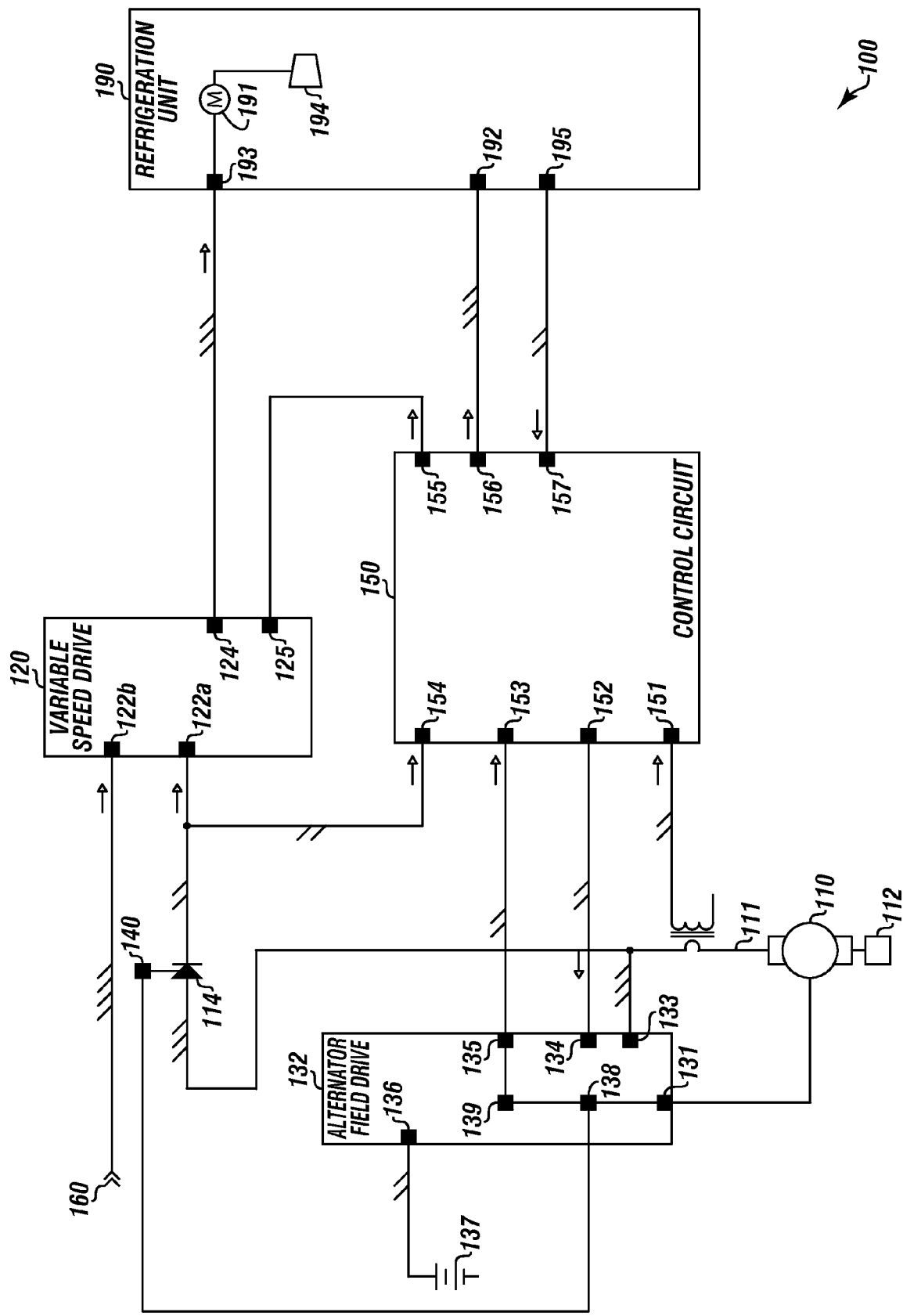

SOFT START DRIVE FOR MOBILE REFRIGERATION UNIT

CROSS REFERENCE TO RELATED APPLICATIONS

The present application claims priority to and the benefit of U.S. Provisional Patent Application Ser. No. 61/458,185 filed on Nov. 19, 2010, entitled "SOFT START DRIVE FOR MOBILE REFRIGERATION UNIT", which is incorporated herein in its entirety.

FIELD

The present embodiments generally relate to a system for driving a three phase motor using a variable speed drive connected to an alternator driven by a prime mover.

BACKGROUND

A need exists for a system for driving a three phase motor using a variable speed drive connected to an alternator driven by a prime mover.

A further need exists for a system that has an alternator operatively connected with a first rectifier connected with a variable speed drive and a second rectifier connected with the variable speed drive and an auxiliary power. The auxiliary power source can be facility power or shore power, An addition need exists for a system for causing the refrigeration electronics to close a start relay without conforming to the normal voltage and phase rotation, allowing the three phase motor to be driven by the variable speed drive.

A further need exists for a cooling system for cooling a truck that can selectively run off of facility power and has the ability to soft start the motor from facility power without concern to correct phase rotation.

The present embodiments meet these needs.

BRIEF DESCRIPTION OF THE DRAWINGS

The detailed description will be better understood in conjunction with the accompanying drawings as follows:

FIG. 1 depicts a schematic of a system for driving a three phase motor using a variable speed drive connected to an alternator driven by a prime mover.

The present embodiments are detailed below with reference to the listed FIGURES.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments generally relate to a system for driving a motor using a variable speed drive connected to an alternator driven by a prime mover. The motor can be of any standard voltage used in industrial applications, such as from 208 Volts to 440 volts Alternating Current.

The system can include an alternator operatively connected to the prime mover. The alternator can be any three phase alternator. The alternator can provide a voltage that ranges from about 120V to about 480V.

The alternator can be connected to a rectifier. For example, three phase stator windings of the alternator can be connected directly to the input bridge rectifier of a commercially available Variable Speed Drive. The rectifier can bridge, rectify, and regulate the voltage generated by the alternator. The voltage from the alternator can be regulated to meet a predetermined voltage for the variable speed drive.

The DC link of the input of the variable speed drive can be connected with a rectifier. The output of the variable speed drive can be connected with a three phase motor to drive the three phase motor at various rotational speeds.

The variable speed drive can include an integrated rectifier. The integrated rectifier can be selectively connected with an auxiliary power source. The auxiliary power source can be shore power, facility power, or combinations thereof.

A logic and alternator field drive can be operatively connected with the alternator and the rectifier. The logic and alternator field drive can be configured to sense voltage leaving the rectifier and control the alternator to maintain a predetermined output from the rectifier.

The system can also include a trick circuit that simulates the presence of a three phase input from the auxiliary power source causing the start relay to close, allowing the variable speed drive to actuate the three phase motor.

The variable speed drive can receive a signal from closure of the start relay in the refrigeration system that causes the variable speed drive to start at low voltage and frequency to soft start the three phase motor with high torque and low revolutions per minute. Soft starting can occur from the characteristic slip frequency of the three phase motor.

A control circuit can be in communication with the rectifier, the alternator, the three phase motor, and the logic and alternator field drive to control the frequency to the motor. Controlling the frequency to the motor changes the speed/RPM of the motor. Changing the speed/RPM of the motor reduces the load on the motor and ultimately on the alternator.

The control circuit can include a circuit that simulates the presence of the three phase input from an auxiliary power source causing a start relay to close, allowing the variable speed drive to actuate the three phase motor. The circuit can receive input from a refrigeration unit, thermostat, or other device requiring a motor to be started.

The system can be used to perform a method of driving a three phase motor using a variable speed drive connected to an alternator.

The method can include tricking a start relay on a three phase motor. Tricking the start relay causes the start relay to close allowing the three phase motor to start.

The method can also include using the variable speed drive to soft start the three phase motor.

The method can also include monitoring the load on the alternator and changing the frequency and load on the variable speed drive to prevent the alternator from being overloaded.

Turning now to the FIGURE, FIG. 1 depicts a schematic of a system for driving a three phase motor using an alternator driven by a prime mover.

The system 100 can be mounted on a truck or other vehicle. The system can be configured to run a compressor when the truck or vehicle is idle. Thereby, providing a green method of keeping refrigerated compartments on a vehicle at predetermined temperatures without the need of running a diesel or other auxiliary internal combustion engine. The system can also be configured to run the compressor off of shore power, facility power, or combinations thereof when the prime mover is turned off, and the system is configured to provide a soft start to a three phase motor running the compressor.

The system 100 can include an alternator 110. The alternator 110 can be connected with a prime mover 112. The prime mover 112 can be an engine for a truck or vehicle. The alternator 110 can be any three phase alternator that produces the necessary voltage.

The alternator 110 can generate an electric output 111. The alternator 110 can be operatively connected with a rectifier 114, allowing the rectifier 114 to receive voltage from the alternator 110. The rectifier 114 can be any three phase bridge rectifier.

The rectifier 114 can operatively be connected with a first input 122a of a variable speed drive 120, which can be a DC link of the variable speed drive 120. A second input 122b of the variable speed drive 120 can be connected with an auxiliary power source 160. The second input 122b can be an integrated bridge rectifier.

In one or more embodiments, not shown, the auxiliary power source 160 can be connected to the rectifier 114, and the alternator 110 can be connected to the second input 122b.

The variable speed drive 120 can have an output 124 connected to a three phase motor 191 of a refrigeration unit 190. The output 124 can send three phase power to a three phase input port 193 in communication with the three phase motor 191. The level of three phase power sent from the output 124 to the three phase input port 193 can determine the rate of rotation of the three phase motor 191. The three phase motor 191 can be configured to run a compressor 194 in the refrigeration unit 190 to cool a compartment on a vehicle or truck.

The variable speed drive 120 can be programmed to soft start the three phase motor 191.

The variable speed drive 120 is programmed to produce an algorithm of voltage and frequency that will cause the three phase motor 191 to start at a low RPM and increase at a selectable rate to start the three phase motor 191 under a full load at the then normal 60 Hz sine wave voltage of 230 volts. The soft start by the variable speed drive 120 eliminates the starting surge normally required to start the three phase motor 191, by soft starting the three phase motor 191. The elimination of the surge associated with starting three phase motor 191 can allow the size of alternator 110 to be reduced.

The soft start of the three phase motor 191 allows the use of an electronic box with a smaller foot print than the foot print of electronic boxes used by other systems. The soft start of the three phase motor 191 allows a small alternator to drive the motor. The soft start also reduces the load put on the vehicle engine and on the drive belts, etc. by the alternator 110.

A logic and alternator field drive 132 can be in communication with the alternator 110 and the output of the rectifier 114.

The logic and alternator field drive 132 can have an alternator port 131 connected to the alternator 110. The logic and alternator field drive 132 can send signals from the alternator port 131 to the alternator 110 to control the voltage of the electric output 111.

The logic and alternator field drive 132 can detect current, voltage, or both of the electric output 111 using a logic and alternator field drive alternator port 133.

The logic and alternator field drive 132 can also have a power input 136 that can be connected with a logic and alternator field drive power source 137. The logic and alternator field drive power source 137 can be a battery with a voltage from about 5 volts to about 30 volts. The logic and alternator field drive power source 137 can be used to "boot" the alternator 110 until the alternator 110 produces the power to drive its own field.

The logic and alternator field drive 132 can be in communication with the rectifier 114. The rectifier 114 can have a rectifier DC link 140 that is configured to receive input regarding the voltage output from the rectifier 114 and provide the input to the logic and alternator field drive 132.

The system 100 can include a control circuit 150. The control circuit 150 can include a control circuit power level port 153. The control circuit power level input 153 can be in communication with the logic and alternator field drive 132 via a power level port 135. The power level port 135 can be any port. The logic and alternator field drive 132 can send input to the control circuit power level port 153 regarding the power level coming from the alternator 110. The power level coming from the alternator 110 is determined by using a pulse width modulated (PWM) circuit to determine the pulse of the field being produced for the alternator 110. The PWM circuit 138 can be connected with a linear signal producer 139. The liner signal producer 139 can send a signal representative of the load on the alternator to the control circuit power level port 153.

For example, the control circuit can be communication with the variable speed drive and the logic and alternator field drive, and the control circuit can send signals to the variable speed drive to prevent the alternator from being overloaded at predetermined alternator field currents.

The logic and alternator field drive 132 can monitor the output of the rectifier and send signals to the control circuit 150 using the linear signal producer 139 and power 10 level port 135. The control circuit 150 can be set to one or more predetermined set points. For example, the PWM circuit 138 can receive input from the rectifier DC link 140 to control and act to keep the electric output 111 at a constant voltage. The logic and alternator field drive 132 can send signals to the control circuit 150, and the control circuit 150 can use the speed output port 155 to control the speed of the variable speed drive 120 to decrease the current from the rectifier 114 and the current required by the alternator to prevent overload of the alternator.

The control circuit 150 can have a control DC link 154 that is in communication with the rectifier 114, the variable speed drive 120, or both.

The control circuit 150 can transmit high field data via a control circuit high field port 152 to the logic and alternator field drive 132. This is another way of sensing alternator load to prevent drawing excessive power from the alternator. For example, a current sense transformer, of the alternator, can sense high stator current and feed into the control circuit high field port 152 that is connected to the logic and alternator field drive high field port 134. As such, the logic and alternator field drive 132 can receive data from the stator current circuit to act on the high field current to overload of the alternator 110 in a way other than field current.

The control circuit 150 can receive data to determine the current field of the alternator 110 via the alternator current port 151.

The control circuit 150 can have the speed output port 155 connected to a speed command input port 125 located on the variable speed drive 120. The control circuit 150 can send signals from the speed output port 155 to the variable speed drive 120 to control the speed at which the three phase motor 191 is driven.

The control circuit 150 can include a trick circuit output 156. The trick circuit output 156 can be connected with a voltage detection input 192 on a three phase start relay 195.

The three phase start relay 195, which can be a contactor coil, can close when the voltage detection input 192 receives a signal from the trick circuit output 156, allowing the three phase motor 191 to be driven by the variable speed drive 120. The three phase start relay 195 can be connected with a relay input port 157 on the control circuit 150. As such, the control circuit 150 can determine when the three phase start relay 195 closes.

In operation, the alternator 110 can be driven by the prime mover 112. As the alternator 110 is driven the alternator can receive signals from the alternator port 131 to control the voltage generated by the alternator 110. The electric output 111 can be exported from the alternator and the current of the electric output 111 can be measured by the control circuit 150 via the alternator current port 151.

If the control circuit 150 determines, via the alternator current port 151, a alternator field current that is to large, the control circuit 150 sends a signal via the speed output port 155 to the variable speed drive that reduces the frequency thereof. Reducing the frequency of the variable speed drive can reduce the speed of the three phase motor. Reducing the speed of the three phase motor reduces the load of the compressor and the field current needed to supply the variable speed drive at that alternator RPM.

While these embodiments have been described with emphasis on the embodiments, it should be understood that within the scope of the appended claims, the embodiments might be practiced other than as specifically described herein.

What is claimed is:

1. A soft start apparatus for a three phase motor using an alternator driven by a prime mover, wherein the apparatus comprises:
   a. an alternator operatively connected to the prime mover;
   b. a rectifier connected with the alternator;
   c. a variable speed drive comprising an input and an output, wherein the input is connected to the rectifier, wherein the output is connected to the three phase motor, and wherein the variable speed drive is configured to drive the three phase motor at selective rotational speeds, wherein the variable speed drive is configured to soft start the three phase motor with high torque and low revolutions per minute, wherein the soft start occurs at a slip frequency of the motor; and
   d. a logic and alternator field drive configured to sense voltage leaving the rectifier and controlling the alternator to maintain a predetermined output from the rectifier, wherein the logic and alternator field drive:
      monitors an alternator field current, an alternator stator current or an alternator phase current to maintain the predetermined output from the rectifier; and
      (ii) communicates information about the alternator to the system; and
   e. a control circuit in communication with the rectifier, the alternator, the three phase motor, and the logic and alternator field drive, wherein the control circuit communicates with, and controls the alternator, and further wherein the control circuit comprises a circuit that communicates a presence of a power source causing the variable speed drive to actuate the three phase motor.

2. The apparatus of claim 1, wherein the variable speed drive comprises an integrated rectifier, wherein the integrated rectifier is selectively connected with auxiliary power.

3. The apparatus of claim 1, wherein the control circuit sends to signals to the variable speed drive to prevent the alternator from being overloaded at a predetermined alternator field and stator current.

4. A method of soft starting a three phase motor using an alternator driven by a prime mover, wherein the method comprises:
   a. using a control circuit, wherein the control circuit comprises a circuit that communicates a presence of a power supply to a variable speed drive;
   b. using the variable speed drive to soft start the three phase motor; wherein the variable speed drive is in communication with a rectifier that receives input electricity from a three phase alternator, wherein the variable speed drive is configured to soft start the motor with high torque and low revolutions per minute, wherein the soft start occurs at a slip frequency of the motor;
   c. using a logic and alternator field drive to monitor an alternator field current, an alternator stator current or an alternator phase current to maintain a predetermined output from the rectifier,
   d. using the control circuit to monitor the alternator field current, the alternator stator current or the alternator phase current and adjusting the variable speed drive to prevent the alternator from being overloaded.

* * * * *